United States Patent Office 3,275,552
Patented Sept. 27, 1966

3,275,552
WELL TREATING COMPOSITION AND METHOD
Curtis R. Kern and Herbert L. Rice, Houston, Tex., assignors, by mesne assignments, to Milchem Incorporated, a corporation of Delaware
No Drawing. Filed Apr. 23, 1963, Ser. No. 274,957
2 Claims. (Cl. 252—8.55)

This invention relates to well treating compositions and to methods for the preparation thereof. More particularly, this invention relates to solid, surface active compositions for use in de-watering, cleaning, and otherwise treating gas and oil wells for a variety of purposes and to methods for preparing such compositions. This invention further relates to a method of treating gas and oil wells.

In the production of gas from gas wells, a common difficulty is encountered in the field resulting from the flow of salt water, along with the gas, into the bottom of the well from the same or near-by formations. If the flow of gas is not sufficient to carry out the salt water, it accumulates in the well, and, as a consequence, the column of salt water exerts a hydrostatic head, the pressure of which reduces the flow of gas from the well, thereby slowing down production and, in some cases, virtually stopping the flow of gas entirely. It becomes necessary, therefore, to de-water the well from time to time in order to re-establish the normal flow of gas therefrom. In addition to the accumulation of salt water, accumulations of sand, sledge, emulsified waxes, and the like, also occur in the well and, accordingly, it becomes important to remove these materials from the well also. For such de-watering and well-cleaning purposes, it is frequently desirable to disperse in the aqueous phase of the fluid in the well a suitable surfactant which will cause the water therein to form a relatively light froth or foam which may be easily carried out of the well by the flow of gas therefrom. The successful introduction of a surfactant into the aqueous phase, however, is complicated by a number of factors among which is the fact that the aqueous phase is located at the bottom of the well and, therefore, only difficultly accessible and the fact that the aqueous phase itself is frequently covered by an oil phase lying above it, so that the surfactant must be introduced into the aqueous phase through the oil phase.

In the past, attempts have been made to overcome the problems attendant upon introduction of surfactant into the aqueous phase of the well by introducing thereinto various surfactant preparations, in the form of weighted sticks, so that the solid material falls down the well through the oil layer, if any, into the aqueous layer, to become dispersed therein. Such solid surface active compositions have heretofore, however, proven unsatisfactory in use by reason of one or more disadvantageous characteristics among which are included melting points of solid compositions which are too low and accordingly, unacceptable for practical purposes for use in hot wells or for storage in the field, inability of the surfactant to foam saturated salt water, inability of the surfactant to foam oil-contaminated brines, incompatibility of the surfactant with certain corrosion inhibitors, tendencies of the surfactant materials to emulsify foamed oil and water mixtures and, finally, excessive brittleness of the solid composition when formed.

It is, accordingly, an object of the present invention to provide a surface active composition in solid form for use in the treatment of gas and oil wells at depths at which the use of liquid surfactant formulations would be impractical or useless.

It is another object of this invention to provide a solid water soluble, surface-active composition that may be applied to the aqueous phase of the well by passage through an oil layer without melting or dissolving.

It is another object of this invention to provide a solid surface-active composition having the capacity not only to foam fresh water, hard water and salt water solutions, but also brine and oil mixtures as well.

It is another object of this invention to provide a surface-active composition in a solid form which is sufficiently pliable and non-brittle to avoid breakage thereof during use in treating wells and which has at the same time, a melting point sufficiently high to avoid deterioration of the composition upon storage in the field.

It is another object of this invention to provide a solid, water-soluble surface-active composition which will promote the demulsification of foamed oil and water mixtures, removed from treated wells.

It is another object of this invention to provide a solid, water-soluble surface-active composition for use in treating gas and oil wells which is compatible with known corrosion inhibitors commonly used in such wells.

It is another object of this invention to provide a solid multi-functional surface-active composition suitable for use in a variety of treatments of gas and oil wells.

It is another object of this invention to provide a method of preparing such solid water-soluble surface-active compositions.

It is another object of this invention to provide a method of treating gas and oil wells.

The foregoing objects and still further objects are accomplished according to the present invention by providing a surface-active composition which comprises a suitable surface-active agent in combination with a water-soluble, crystalline or waxy carrier or binder in solid form. The carrier and surface-active agent of the present invention may be combined in different ways, the particular manner of preparation of the composition ordinarily depending upon the surface-active agent selected for the use intended.

The water-soluble carrier which is used according to the present invention may be any crystalline or waxy material which is solid at ordinary temperatures and which has a melting point sufficiently high that the composition of which it is a component will itself have a melting point which is above the temperatures ordinarily encountered in the field, as in hot wells, or to which the product may be exposed during storage. When the product is contemplated for use in cold wells, the melting point of the composition may be somewhat lower. More specifically, according to the present invention, any carrier may be used which has a melting point generally within the range of about 140° F. to 360° F. and which does not adversely affect or react with the surface-active material used. Among the carriers which are suitable for use in the preparation of compositions of the present invention are solid, water-soluble alcohols, particularly hexitols, ether alcohols, polyethylene glycol, carbowaxes and urea. Because of its inert and relatively non-brittle character, sorbitol is a preferred carrier and diluent for use in the compositions and methods of the present invention.

A wide variety of surface-active agents may be used in accordance with the present invention and these may be "ionic," anionic, cationic or non-ionic in character. Generally, also, in the practice of the invention, the use of surface-active materials which are solid at room temperature is preferred, although liquid surface-active materials are not necessarily precluded. The surface active agents selected for use in the preparation of the composition of the present invention will depend upon the particular type of well treatment that it is desired to effect, i.e., the surface-active material used will be chosen alternatively for its foaming characteristics, its detergent characteristics, its bacteriostatic or other properties, or for some combination of such characteristics.

Certain especially important and useful surface-active materials used in the practice of this invention are comprised of a family of surfactants having a betaine type structure characterized by the chemical group,

two important classes of which are broadly exemplified by the following generalized formulas:

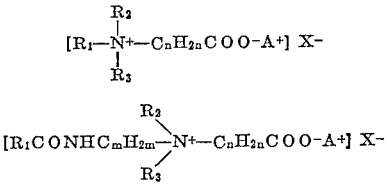

wherein $R_1$ is an alkyl group containing from 10 to 20 carbon atoms, $R_2$ and $R_3$ are alkyl or aryl groups containing from 1 to 7 carbon atoms and 0 to 3 oxygen atoms per group, A is an alkali metal, X is a halogen, $m$ is an integer from 2 to 4 and $n$ is an integer from 1 to 2. Such betaine type surface-active materials may in general be conveniently prepared by the reaction of a tertiary amine of the type $R_1N(R_2)(R_3)$ or a tertiary amido amine of the type $R_1CONHC_mH_{2m}N(R_2)(R_3)$, wherein $R_1$ is an alkyl group containing from 10 to 20 carbon atoms, $R_2$ and $R_3$ are alkyl or aryl groups containing from 1 to 7 carbon atoms and 0 to 3 oxygen atoms per group, and $m$ is an integer from 2 to 4 with an alkali metal salt of a haloacetic acid or a halopropionic acid. Specifically, sodium chloro-acetate is a preferred salt for use in the preparation of betaine type surface-active agents in accordance with the method of this invention.

The betaine type structure of these surface-active materials provides a molecule, the organic portion of which contains positive and negative ions which are independent of pH in aqueous medium and are compatible with both anionic and cationic molecules. Accordingly the molecule cannot, in the strict sense, be appropriately classified as either anionic, cationic or amphoteric. For this reason, it is preferred that the betaine type structure be termed "ionic," since it does exhibit significant surface-active properties.

The term "ionic surfactant" or "ionic surface-active material" as used herein, therefore, is intended to denote a surface-active material having a betaine type structure as described and, accordingly, the term "ionic" whenever used throughout this specification will be understood to be restricted to compounds of that type.

Another group of surface active materials useful in the practice of this invention are those having an anionic structure exemplified by such chemical groups as: $-COO^-X^+$, $(-COO^-)_2Y^+$, $-SO_3^-X^+$ and $(-SO_3^-)_2Y^+$, where X and Y are, respectively, the alkali metal or alkaline earth metal portions of metallic oxides, hydroxides, or carbonates.

Cationic surface-active materials may also be used in the practice of the invention, some of the more important of which are exemplified by a class of quaternary ammonium compounds. For example, cationic quaternary ammonium compounds which may be used as surface-active agents in the composition provided in accordance with this invention include N-fatty trialkyl ammonium halides and N-difatty dialkyl ammonium halides, such as dodecyl dimethyl benzyl ammonium chloride, cetyl dimethyl benzyl ammonium chloride, cetyl trimethyl ammonium chloride; aryl alkyl ammonium chlorides, such as phenol trimethyl ammonium chloride and N-fatty alkyl aralkyl ammonium chlorides, such as stearyl dimethyl benzyl ammonium chloride and tallow dimethyl benzyl ammonium bromide.

In general, any nonionic surface-active material having a melting point greater than 120° F. may also be used in the preparation of a solid surface-active material composition as provided in accordance with the invention. Examples of suitable nonionic surface-active materials which may be used are oxyalkylated fatty acids, such as polyoxyethylene stearate, polyoxyethylene polypropylene stearate and polyoxyethylene palmitate; oxyalkylated alkyl phenols such as poloxyethylene nonyl phenol and polyoxyethylene dodecyl phenol and oxyalkylated alcohols, such as polyoxyethylene tridecyl alcohol and polyoxyethylene stearyl alcohol.

Preferably in accordance with this invention, although not necessarily, a weighting agent is included in the composition in order to increase the density or specific gravity thereof, thereby insuring that the composition, when dropped into the well which it is desired to treat therewith, will sink downward through the liquid in the well to the bottom thereof without undue delay. Nearly any material having the requisite weight or density which will not adversely affect the carrier or surfactant components of the composition may be used as a weighting agent in the composition. Examples of suitable weighting agents which may be used in the practice of the invention are barium sulfate and ferric oxide.

Other additives may also be included in the composition to perform a variety of functions, for example, silica flour $(SiO_2)$ may be added either as an abrasive or to improve the consistency of the solid compositions; water-conditioning, scale preventing, scale removal or dispersal agents may be added, such as Calgons or ethoxylated organic materials; bacteriostatic compounds, such as chlorinated phenol salts; foam stabilizers, such as oxamides; materials which impart control of the viscosity of the products solutions, such as carboxymethylcellulose; as well as builders, lubricants, antiseptics, coloring matter and perfumes.

In accordance with the present invention, the solid surface-active compositions thereof may contain from about 15% to about 85% surface-active materials, with the remainder of the composition consisting of the carrier material or carrier material and additives as described. In those cases where weighting agents or other additives are used, the amount of surfactant will usually be correspondingly smaller, although the amount of surfactant used, within the limits stated above, will in all cases depend upon the particular requirements of the well treatment for which the composition is intended. In general, solid surface-active compositions prepared in accordance with the present invention may be formulated of the following materials within the following ranges of percentage composition by weight:

|  | Percent by weight |
|---|---|
| Carrier | 15 to 85 |
| Surface active agent | 15 to 85 |
| Additive | 0 to 50 |

One method of preparation of the solid surface-active compositions of the present invention, which is both novel and economically advantageous, comprises the in situ manufacture of surfactants of the betaine and cationic types in the molten carrier itself as solvent or diluent. The process, which is a one-step process generally applicable to the production of surface-active compositions containing ionic and cationic types of surface-active materials, broadly includes melting the solid carrier to provide an environment in which the desired reaction may proceed, adding the appropriate reactants thereto and maintaining the conditions necessary to carry out the reaction to produce the desired surfactant and, finally, cooling and forming the surfactant slurry as desired. For example, the betaine type of surfactant may be prepared in situ in molten sorbitol to produce a solid betaine type surface-active composition as provided in accordance with this invention by melting crystalline sorbitol at about 200° F.–210° F. in the presence of a tertiary amine or a tertiary amido amine of the type described and thereafter blending into the liquid slurry one or more additives selected from the group of weighting agents, abrasives, builders, water-conditioning agents, scale removers or preventors, antiseptics, bacteriostatic materials, coloring matter, perfume, or corrosion inhibitors of the quaternary type, the nature and amount of the additive depending upon the use of the solid surface-active composition which is to be produced. At about 290° F., sodium chloracetate is blended into the liquid slurry to convert the tertiary amine or the tertiary amido amine into a betaine type surfactant having a structure of the kind described. The conversion of tertiary amine or amido amine to the betaine type surfactant is essentially complete when a temperature rise accompanying the exothermic reaction between the amine and sodium chloracetate is no longer observed. At temperatures of about 310° F.–320° F. the surfactant slurry is liquid and may be poured into molds. At temperatures of about 280° F.–290° F., a viscous mass results which may be extruded. Further cooling results in a solid product with somewhat pliable nature depending upon the amount of sorbitol used.

Solid surface-active compositions produced by the method of in situ preparation of surfactant in the molten carrier as solvent or diluent according to this invention generally contain from about 25% to about 75% surfactant, with the remainder comprising the carrier material or the carrier material and weighting agent and other additives, if desired.

The following are specific examples of the method of producing solid surface-active chemical compositions by the in situ preparation of surface-active material in the molten carrier as diluent as provided in accordance with this invention:

Example 1

To a suitable vessel is added a weight of crystalline sorbitol equal to 30% of the final charge weight of the reaction mixture, a weight of coco amido tertiary propyl dimethylamine equal to 21% of the final charge weight of the reaction mixture and a weight of caustic powder catalyst amounting to 0.5% of the charge weight of combined coco amido tertiary propyl dimethylamine and sodium chloracetate which is to be added subsequently. The mixture is heated to 210° F.–220° F. to melt all of the crystalline sorbitol. With continued heat and agitation, a weight of sodium chloracetate is then added equal to 9% of the final charge weight of the reaction mixture. When temperatures of 320° F.–350° F. are obtained, a weight of 325 mesh barium sulfate equal to 30% of the final charge weight of the reaction mixture and a weight of silica flour (325 mesh $SiO_2$) equal to 10% of the final charge weight of the reaction mixture are added to the liquid slurry. Thereafter, the slurry is cooled to 290° F. and formed by pouring into hollow cardboard sticks which have been brushed or swabbed with polypropylene glycol (molecular weight 1500). The solid stick thus produced has a specific gravity of 1.24, a melting point greater than 212° F., dissolves (surfactant and sorbitol) in 0–26% by weight of sodium chloride solutions in water, sinks to the bottom of such salt solutions, foams such salt solutions, allows the foaming of such brines with or without lime and containing up to 30% by volume of oil. Finally, the composition prevents emulsification of such foamed oil and brine mixtures.

Example 2

To a suitable vessel are added a weight of crystalline sorbitol equal to 30% of the final charge weight of the reaction mixture, a weight of coco amido tertiary propyl dimethylamine equal to 21% of the final charge weight of the reaction mixture and a weight of caustic powder catalyst equal to 0.5% of the charge weight of the combined coco amido tertiary propyl dimethylamine and sodium chloroacetate which is subsequently added. The mixture is heated to 210° F.–220° F. to melt all of the crystalline sorbitol pellets. At 240° F. a weight of 325 mesh barium sulfate equal to 30% of the final charge weight of the reaction mixture and a weight of 325 mesh silicon dioxide equal to 10% of the final charge weight of the reaction mixture is added. Heating is continued to 290° F. and, thereafter, a weight of sodium chloracetate equal to 9% of the final charge weight of the reaction mixture is added thereto. When no further temperature increase is noted (with the heat turned off), the mixture is cooled to 320° F. and poured into hollow cardboard sticks (capped at one end with aluminum) which have been brushed or swabbed with polypropylene glycol (1500 molecular weight).

The stick produced by the method described above in Example 2 has a specific gravity of 1.3 and its properties and uses are similar to those explained in connection with the product produced by the method of Example 1. The stick produced by the method of Example 2 is useful with air agitation in cleaning up an old well, unloading a gas distillate well "drowned" by hydrostatic head, and for removal of undesirable formation fluids during air drilling operations.

In addition to the preparation of a solid surface-active composition having a betaine type of surface-active material as the principal active ingredient, as illustrated in Examples 1 and 2, the method of production of the composition of the present invention by the in situ preparation of surfactant in the carrier as solvent or diluent is applicable also to the production of solid compositions having as a principal active ingredient thereof cationic surface-active materials comprising quaternary ammonium compounds prepared from tertiary amines of the type $R_1N(R_2)(R_3)$ wherein $R_1$ is an alkyl group containing from 10 to 20 carbon atoms and $R_2$ and $R_3$ are alkyl or aryl groups containing from 1 to 7 carbon atoms and 0 to 3 oxygen atoms per group and alkyl, aryl or arylalkyl halides. The following example is illustrative of the preparation of a solid surface-active composition as provided in accordance with this invention by the reaction of molar quantities of benzyl chloride and N,N-dimethyl lauryl amine in molten sorbitol:

Example 3

To a suitable vessel is added a weight of crystalline sorbitol equal to 30% of the final charge weight of the reaction mixture, a weight of N,N-dimethyl lauryl amine equal to 18.8% of the final charge weight of the reaction mixture and a weight of caustic powder catalyst (NaOH) amounting to .5% of the charge weight of the combined N,N-dimethyl lauryl amine and benzyl chloride to be subsequently added. The mixture is heated to 210° F.–230° F. with a consequent melting of all the sorbitol pellets. Heating and agitation are continued and thereafter a weight of benzyl chloride equal to 11.2% of the final charge weight of the reaction mixture is added. When temperatures of 320° F.–350° F. have been obtained, a weight of 325 mesh barium sulfate equal to 30% of the final charge weight and a weight of silica flour (325 mesh $SiO_2$) equal to 10% of the final charge weight of the reaction mixture are added. Thereafter the slurry is cooled to 290° F. and poured into hollow cardboard sticks brushed or swabbed with polypropylene glycol (molecular weight 1500) to produce a solid surface-active composition in stick form suitable to the foaming treatment of a gas well.

The following are examples of solid surface active compositions as provided in accordance with this invention, suitable for a variety of different well treating operations and which may be prepared by the method of in situ preparation of the surfactant in the molten carrier.

Example 4

| | Percent by weight |
|---|---|
| Sorbitol | 35 |
| Sodium salt of dodecyl dimethyl carboxymethyl ammonium chloride | 50 |
| Benzyl alkyl pyridinium chloride quaternary | 15 |

The above composition cast into sticks provides a soft yet solid stick which acts as an excellent drill bit lubricant in air drilling operations, foams produced water immediately as it occurs and affords corrosion protection to the drill bit and annular tubing in the well.

*Example 5*

| | Percent by weight |
|---|---|
| Sorbitol | 35 |
| Sodium salt of coco amido propyl dimethyl carboxyethyl ammonium chloride | 50 |
| 10-dendro Rosin Amine D | 15 |

(Rosin Amine D is predominantly dehydroabietenyl amine and 10-dendro rosin amine D is the polyoxyethylene derivative of the amine having 10 oxyethylene groups in the molecule thereof.)

The above composition when cast into sticks has characteristics and uses similar to that of Example 4.

*Example 6*

| | Percent by weight |
|---|---|
| Sorbitol | 40 |
| Sodium salt of coco amido propyl dimethyl carboxymethyl ammonium chloride | 40 |
| Silica flour (325 mesh $SiO_2$) | 20 |

When cast into sticks the composition of Example 6 provides an abrasive detergent for physical cleaning operations in oil and gas wells of grime and grease in salt water, sea water or highly calcinated or hard waters.

*Example 7*

| | Percent by weight |
|---|---|
| Sorbitol | 35 |
| Sodium salt of coco amido propyl dimethyl carboxymethyl ammonium chloride | 35 |
| Calgon | 15 |
| 50-dendro nonyl phenol | 15 |

The above composition when cast into sticks provides an excellent hard water detergent and conditioning agent with scale preventing, removing and dispersing properties. The addition of weighting agents allows introduction of the composition into the well as pellets (if desired) for easy access in hard-to-treat locations.

*Example 8*

| | Percent by weight |
|---|---|
| Crystalline sorbitol | 30 |
| Sodium salt of coco amido propyl dimethyl carboxymethyl ammonium chloride | 26 |
| Barium sulfate | 20 |
| 12-dendro tridecyl alcohol | 3 |
| Silica flour (325 mesh $SiO_2$) | 16 |
| Baroid salt gel | 5 |

In accordance with the practice of the present invention, solid forming sticks formed of the composition illustrated in Example 8 have application in air or gas drilling operations wherein from 1 to 2 hours are sometimes required to clean out the hole preparatory to replacement of the bit. In the past, the usual procedure has been to slug 2 to 3 gallons of foaming agent down the drill pipe, wash with water, then try to clean the hole before resuming drilling operations. In accordance with the present invention, the solid foaming composition of Example 8 is introduced into the well as the bit is being changed, thereby preparing the well for instant cleanout.

The following is an example of the method of production of the solid surface active composition illustrated in Example 8 by in situ preparation of surfactant in carrier.

Into a suitable vessel are loaded 180 pounds of crystalline d-sorbitol, 109 pounds of coco amido tertiary propyl dimethyl amine, and 1 pound of caustic soda as catalyst. The mixture is agitated while heating strongly. At 240° F., 120 pounds of barium sulfate are added and the contents allowed to mix well while continuing strong heat. When the temperature returns to 240° F.–250° F., 18 pounds of 12-dendro tridecyl alcohol and 96 pounds of silica flour (325 mesh) are added. The contents are again allowed to mix well and strongly heated. At 275° F., 47 pounds of sodium chloracetate are added to the mixture and the contents are again allowed to mix well with continued heat. Heating is discontinued at 285° F. The temperature should rise to 320° F.–325° F. due to exothermocity of reaction. The heat may be reduced to a level designed to produce a batch temperature of 255° F. (pouring temperature), if desired. When the reaction is complete, the temperature begins to fall. At 310° F., the baroid salt gel (a form of bentonite) is added and mixed in well. Thereafter the batch is cooled to 255° F. and maintained at that temperature while pouring the mix into cardboard molds with aluminum lining swabbed with motor oil.

In addition to the method of producing surface active compositions of this invention by the in situ preparation of the surfactant material in the molten carrier, the aforesaid composition may also be produced by a second method of more general applicability, namely, by preparing the surfactant material separately and subsequently incorporating the material into the molten carrier. In general, however, the method of preparation of surfactant in situ in the molten carrier is preferred where applicable because of the obvious advantages afforded thereby in the saving of time and labor expended in the handling of materials.

The following are additional examples of surface-active compositions of the present invention which may be prepared by the direct incorporation of surfactant into the molten carrier:

*Example 9*

| | Percent by weight |
|---|---|
| Sorbitol | 60 |
| 20-dendro tridecyl alcohol | 40 |
| Dye | Trace |
| Perfume | Trace |

When cast into bars the composition of Example 9 is a suitable hard water nonionic water soluble detergent. Cast into bars without the dye or perfume, the product lowers surface tension and finds application as a dispersing agent.

*Example 10*

| | Percent by weight |
|---|---|
| Sorbitol | 50 |
| Dodecyl benzene sulfonate | 30 |
| Silica flour (325 mesh $SiO_2$) | 20 |

The composition of Example 10 may be used as a regular soft water abrasive detergent or, with chlorinated phenol salts, as a bactericidal composition.

Ordinarily in the practice of the present invention the solid surface-active compositions produced in accordance therewith are shaped in the form of sticks which may be conveniently dropped into the mouth of the well which it is desired to treat and allowed to fall toward the bottom of the well under the force of gravity. The density of the solid stick allows it to fall through the liquid layers of the well to reach remote parts thereof which would be inaccessible with the use of liquid surfactants or lighter surfactants having too low a specific gravity. When the solid surface-active composition has reached the aqueous phase of the well, the water-soluble carrier dissolves to release the surface-active component of the composition, thereby allowing it to become dispersed throughout the aqueous phase. Thereafter, the action of the flow of gas in the well together with the surface-active agent in the water causes the water to foam. The light foam is then carried upward in the well by the gas flow, through the oil phase, if any, where some of the oil may also be caused to foam, thereby creating a foamed oil and water mixture which is ultimately carried by the flow of gas out of the well.

From the foregoing description of the invention it will be apparent that the use of betaine type surfactants as foaming agents in the treatment of wells as described is an important and advantageous feature of the invention not only by reason of its excellent foaming action in waters containing from 0% to 26% by weight of foam dissolved therein; its excellent detergent action in such waters, and also in hard and calcinated waters; its ability to foam oil and water mixtures containing up to 30% oil by volume but, also, by reason of its demulsifying action in the separation of oil and water from foam mixtures after such mixtures have been removed from the treated well.

Still another important and advantageous feature of the invention lies in the use of a water-soluble carrier for the surfactants of the present invention which carrier does not dissolve in the oil phase of the well as has a melting point sufficiently high that it will not melt in hot wells, thereby ensuring that the solid surface-active composition will reach the location in the well at which it is needed. Specifically, the use of sorbitol as a carrier material for the surface-active compositions of the present invention, as disclosed in the foregoing description and examples, is especially advantageous as a water-soluble binder for surfactants and conditioning agents which imparts a crystalline or solid character to the solid surface-active composition itself, yet affords an "elastic" rigidity to the composition not found in most crystalline surfactant carrying media. Sorbitol, moreover, is an excellent liquid medium in which to prepare the betaine type surfactants in the method of in situ preparations of such surfactants as previously described. It is, moreover, an inexpensive, inert diluent for such betaine surfactants and provides an acceptable melting point of over 200° F. for the solid surface-active composition.

Still another advantageous feature of the invention lies in the ease with which more or less amounts of weighting agent may be added to control the specific gravity of the solid surface-active composition as provided in accordance with the invention thereby ensuring a final product which can be placed in "hard to get to" locations, such as the bottom of an oil well. Moreover the method of preparation of the surface-active compositions of the present invention as afore described lend themselves easily to the addition of other additives of the kinds previously mentioned to provide a variety of treatments or combination of treatments for gas and oil wells as desired.

Although this invention has been described with reference to specific surface-active materials, binders, weighting agents and additives of various kinds, as specific chemical steps and types of processes, it will be appreciated that other and additional materials, steps or processes may also be used. For example, materials having similar properties may be substituted for those specifically described, chemical steps may be reversed and equivalent processes used, all within the spirit and scope of this invention as defined in the appended claims.

Having thus described our invention, we claim:

1. A method of preparing a solid, water-soluble surface-active composition for use in wells, comprising the steps of melting crystalline sorbitol in the presence of molal quantities of (1) an amine consisting of a member selected from the group characterized by the generalized formulas $$R_1N(R_2)(R_3) \text{ and } R_1CONHC_mH_{2m}N(R_2)(R_3)$$

wherein $R_1$ is an alkyl group containing from 10 to 20 carbon atoms, $R_2$ and $R_3$ are alkyl groups containing from 1 to 7 carbon atoms and $m$ is an integer from 2 to 4, and (2) a compound selected from the group consisting of sodium chloroacetate and sodium chloropropionate, conducting the reaction between said amine and said compound in the presence of the molten sorbitol at a temperature increasing from about 210° F. to about 350° F., and thereafter cooling the resulting reaction mixture to form a solid composition.

2. In the method of claim 1, the step of adding a powdered weighting material to the reaction mixture when the same has attained the maximum reaction temperature.

References Cited by the Examiner

UNITED STATES PATENTS

| | | | |
|---|---|---|---|
| 2,082,275 | 6/1937 | Daimler et al. | 260—25 |
| 2,559,583 | 7/1951 | Barker | 252—152 |
| 2,665,256 | 1/1954 | Barker | 252—152 |
| 2,702,279 | 2/1955 | Funderburk et al. | 252—152 |
| 2,756,211 | 7/1956 | Jones. | |
| 2,824,059 | 2/1958 | Chamot. | |
| 2,891,009 | 6/1959 | Case. | |
| 2,970,959 | 2/1961 | Jones. | |
| 3,072,690 | 1/1963 | Lee et al. | 260—404.5 |
| 3,073,387 | 1/1963 | Dunning et al. | 166—45 |
| 3,076,508 | 2/1963 | Lissant | 166—45 |
| 3,108,635 | 2/1963 | Chittum | 252—358 |

OTHER REFERENCES

Using Foaming Agents to Remove Liquids From Gas Wells, Dunning et al., U.S. Dept. of Interior, Bureau of Mines, Monograph 11, 1961, pages 1, 2, 3, 7, and 10 to 13.

LEON D. ROSDOL, *Primary Examiner.*

JULIUS GREENWALD, *Examiner.*

H. B. GUYNN, *Assistant Examiner.*